March 6, 1956  R. O. DU RALL  2,737,152

POULTRY FEEDER

Filed Dec. 1, 1952  2 Sheets-Sheet 1

Robert O. Du Rall
INVENTOR.

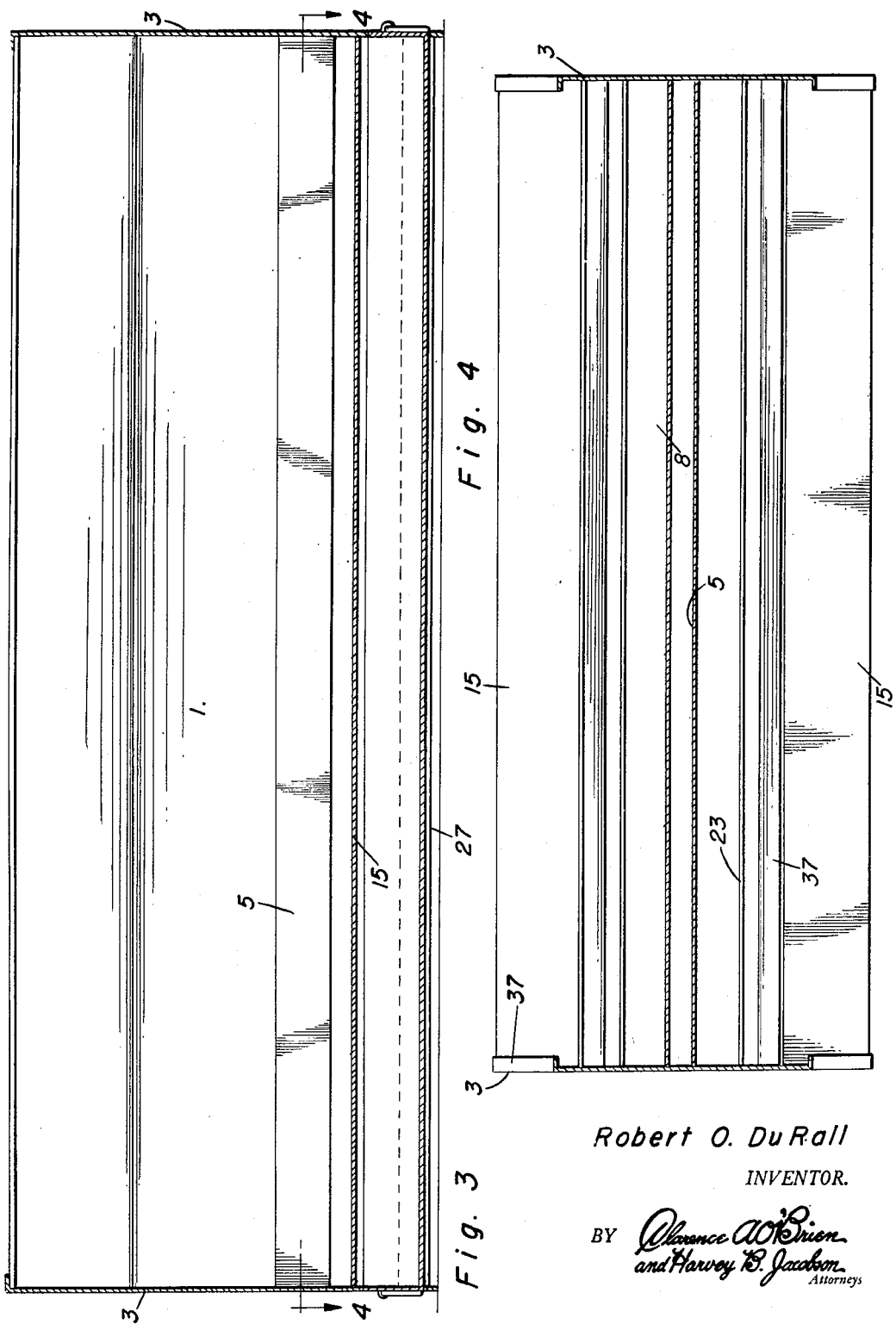

United States Patent Office 2,737,152
Patented Mar. 6, 1956

2,737,152
POULTRY FEEDER
Robert O. Du Rall, Carbondale, Ill.
Application December 1, 1952, Serial No. 323,459
1 Claim. (Cl. 119—52)

My invention relates to improvements in poultry feeders of the hopper supply type.

The primary object of my invention is to provide in such feeders improved means for catching and saving feed dropped, or scattered by the poultry in feeding, and thereby greatly reduce the costs of raising poultry.

Another object is to provide in such feeders improved means for catching and saving feed dropped by poultry outside a feed pan while feeding on raised platforms at the sides of the pan.

Still another object is to provide a feeder for accomplishing the above purposes which is of simple, strong, and comparatively cheap construction.

Other and subordinate objects, within the purview of my invention, together with the precise nature of my improvements will be readily understood when the succeeding description and claim are read with reference to the drawings accompanying and forming part of this specification.

In said drawings:

Figure 3 is a view in vertical longitudinal section taken on the line 3—3 of Figure 2; and Figure 4 is a view in horizontal section taken on the line 4—4 of Figure 3 and drawn to a smaller scale.

Figure 1:
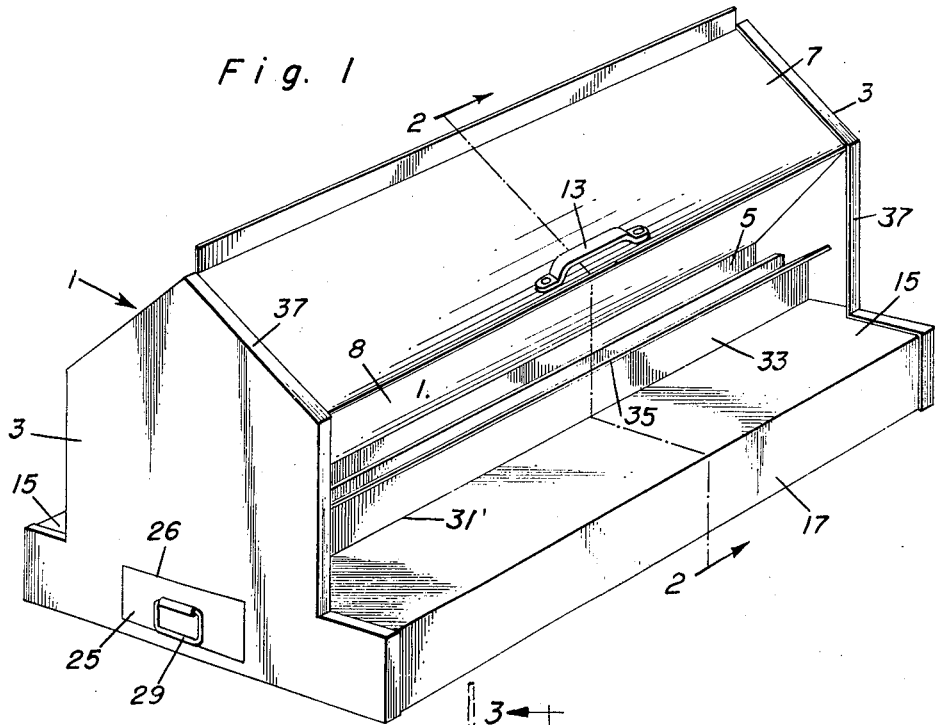
Figure 1 is a view in perspective of my improved poultry feeder in the preferred embodiment thereof.
Figure 2:
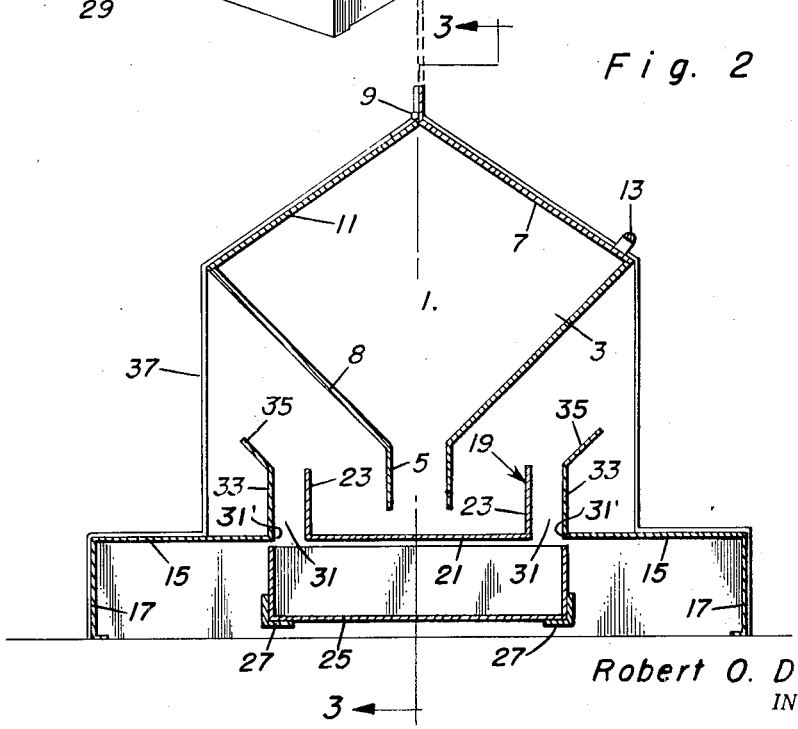
Figure 2 is an enlarged view in vertical transverse, central section taken on the line 2—2 of Figure 1.

Referring to the drawings by numerals, the feeder of my invention comprises an elongated, closed, feed supply hopper 1, of diamond-shape in cross-section, preferably, suspended by a pair of end walls 3 of the feeder 1 adapted to rest on a floor or the ground. A central, longitudinal feed discharge drop 5 extends along the bottom of the hopper 1 from end to end thereof, and a top cover plate 7 for said hopper is hinged, as at 9, to a top panel 11 of said hopper, the cover plate 7 being provided with a suitable handle 13 for swinging said cover plate open and closed.

A pair of raised platforms 15 are provided in coplanar spaced apart relation at opposite sides of the discharge drop 5, below the same, and which extend between said end walls and comprise depending outer side flanges 17 for engaging the ground to prevent the poultry from getting under said platforms. The platforms 15 are spaced equidistantly from opposite sides of the discharge drop 5 for a purpose presently seen.

A feed pan 19 is provided below the discharge drop 5 which is relatively narrower than the hopper 1 so that said hopper will overhang the same and protect the food in the pan 19 from rain and the like. The feed pan 19 is closed at its ends by the end walls 3 which form the ends of said pan, and is centered longitudinally relative to said discharge drop 5 with its bottom 21 below said drop flush with the platforms 15, and with vertical side walls 23 spaced equidistantly from said platforms 15 and well below the bottom 8 of the hopper 1 for access to the sides of said pan 19 by poultry standing on said platforms 15. The side walls 23 of the feed pan 19 are spaced from the discharge drop 5 laterally and the bottom 8 of the hopper 1 a suitable distance for easy access to said pan by the poultry.

A waste catch drawer 25 for feed dropped, or scattered outwardly of the pan 19 at the sides thereof, is slidably extended through an opening 26 in one end wall 3 to underlie the feed pan 19 and extend along the full length thereof. The catch drawer 25 is wider than the feed pan 19 to catch feed dropped by the poultry outwardly of said pan and is mounted in centered relation to the feed pan 19 on angle bar guides 27 extending longitudinally between the end walls 3. A suitable handle 29 is provided on one end of the catch drawer 25 for sliding the same.

Means is provided on the platforms 15 coacting with the side walls 23 of the feed pan 19 to form waste feed drops, or slots 31 extending along the sides of the feed pan 19 for the full length thereof and opening into the catch drawer 25 at the sides of said drawer. This means comprises upstanding perpendicular walls 33 extending along the inner edges 31' of the platforms 15 perpendicular thereto and spaced from the side walls 23, with upper edge flanges 35 inclining upwardly and outwardly over the platforms 15 and extending above the side walls 23.

Preferably the entire feeder, with the exception of the handles 13, 29 is formed of sheet metal and the end walls 3 are provided with inwardly extending edge flanges 37 overlapping the top panel 11, platforms 15 and flanges 17 and fixed thereto, as by solder, not shown, with the feed pan 19 and guides 27 fixed by solder, at the ends thereof, not shown, to said end walls 3. This arrangement provides for inexpensive construction of the feeder while at the same time the parts are rigidly fixed in place.

As will now be clear, feed discharged by gravity from the hopper 1 into the feed pan 19 is readily available to the poultry from the platforms 15 and the poultry feed over the flanges 35 and drops 31 so that any feed dropped outwardly of the pan by the poultry will fall into the catch drawer 25 through the drops 31. The drawer 25 may be withdrawn and the waste feed caught therein recovered and deposited again in the hopper 1.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

What is claimed as new is:

A poultry feeder comprising a pair of end walls adapted to rest on the ground and one of which is provided with an opening, a pair of raised spaced apart platforms extending in a common plane between and attached to said end walls and having inner edges, upstanding walls on the inner edges of said platforms, a feed pan between said upstanding walls extending between and fixed to said end walls and having vertical sides spaced from said upstanding walls to form feed drops, a waste pan underlying the feed pan and wider than said feed pan to catch feed falling through said drops, angle iron guide bars extending between and fixed to said end walls and slidably supporting said waste pan for removal out of said opening, and upper edge flanges on said upstanding walls inclining upwardly and outwardly over the platforms and extending above said vertical sides of the feed pan for preventing feed dropped by poultry feeding on the platforms from dropping onto the platforms and deflecting such feed into said drops, said end walls being adapted to support a feed hopper over said feed pan.

References Cited in the file of this patent
UNITED STATES PATENTS

| | | |
|---|---|---|
| 1,125,044 | Beane | Jan. 19, 1915 |
| 1,176,256 | Trumpen | Mar. 21, 1916 |
| 1,335,424 | Brown | Mar. 30, 1920 |
| 1,878,555 | Uhrik | Sept. 20, 1932 |
| 2,525,654 | DeVille | Oct. 10, 1950 |
| 2,539,536 | Floch | Jan. 30, 1951 |